United States Patent [19]

Ferguson et al.

[11] 4,378,097
[45] Mar. 29, 1983

[54] HIGH PERFORMANCE SUBMERGED AIR INLET

[75] Inventors: Stanley D. Ferguson, Seattle; Donald W. Eastman, Renton, both of Wash.

[73] Assignee: The Boeing Company, Seattle, Wash.

[21] Appl. No.: 209,951

[22] Filed: Nov. 24, 1980

[51] Int. Cl.$^3$ .................. B64D 33/02; F02C 7/04
[52] U.S. Cl. .................. 244/53 B; 137/15.1; 244/15
[58] Field of Search .................. 244/53 R, 58, 53 B, 244/73 R, 15, 57, 3.1, 209, 14, 130; 102/374, 375, 381; 137/15.1, 15.2; 138/37, 39, 40, 42; 60/269, 244, 221, 222, 270; 440/38–47; 98/1, 1.5, 61, 62, 64; 415/13, 219 R, 182, DIG. 7

[56] References Cited

U.S. PATENT DOCUMENTS

| | | | |
|---|---|---|---|
| 2,477,637 | 8/1949 | Mercier | 244/209 |
| 2,721,715 | 10/1955 | Hoadley | 244/130 |
| 2,810,534 | 10/1957 | Fandeux | 244/58 |
| 2,938,334 | 5/1960 | McLafferty | 60/35.6 |
| 2,970,431 | 2/1961 | Harshman | 60/35.6 |
| 3,033,491 | 5/1962 | Clark | 244/53 B |
| 3,066,892 | 12/1962 | Smith et al. | 244/53 |
| 3,329,377 | 7/1967 | Peterson et al. | 244/53 |
| 3,444,872 | 5/1969 | Gabbay | 137/15.1 |
| 3,514,957 | 5/1970 | Evans | 60/270 |
| 3,524,458 | 8/1970 | Goldsmith | 137/15.1 |
| 3,532,305 | 10/1970 | Madelung | 244/53 |
| 3,540,221 | 11/1970 | Bouiller et al. | 60/244 |
| 3,583,661 | 5/1971 | Stake | 244/53 B |
| 3,613,704 | 10/1971 | Goldsmith | 137/15.2 |
| 3,667,703 | 5/1972 | Boek | 244/53 B |
| 3,752,422 | 8/1973 | Runnels | 244/118 R |
| 3,811,397 | 5/1974 | Usbonve | 440/47 |
| 3,993,015 | 11/1976 | Klepacz et al. | 440/47 |
| 4,121,606 | 10/1978 | Holland | 137/15.1 |

FOREIGN PATENT DOCUMENTS 1173345 7/1964 Fed. Rep. of Germany .... 244/53 B

*Primary Examiner*—Galen L. Barefoot
*Attorney, Agent, or Firm*—Delbert J. Barnard; Eugene O. Heberer; Joan H. Pauly

[57] ABSTRACT

A smooth surfaced, submerged air inlet for use generally forwardly of an engine in an aircraft (missile or other air vehicle). The inlet has an opening having wall surfaces adapted to be flush with or inwardly of an aircraft body surface. The wall surfaces of the opening have a leading and outer end in a plane and the surfaces extend inwardly to form an uncovered shallow channel-shaped portion to the inlet, the channel portion deepening inwardly in the trailing direction and continuing into a partial ellipse portion of the opening. The ellipse portion deepens inwardly as it extends in a trailing direction and has substantially parallel wall surfaces extending outwardly of the ellipse in the direction toward the level of the plane. There are extensions of said substantially parallel wall surfaces diverging outwardly to said plane. There is an inwardly trailing surface, spaced outwardly from the partial ellipse portion, being joined to the substantially parallel wall surfaces to form an outer cover for a trailing part of said inlet and of said partial ellipse portion. The inlet, including the cover, trails inwardly and is contoured radially as it trails to form a substantially circular wall surface at its inner end.

30 Claims, 26 Drawing Figures

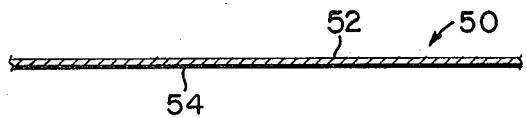
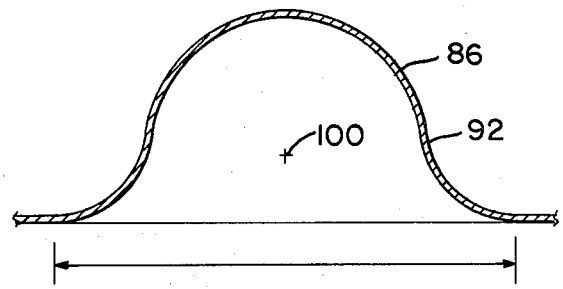
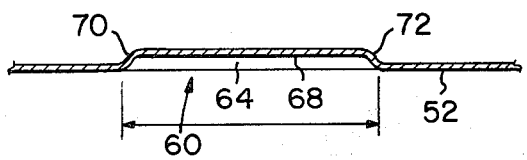
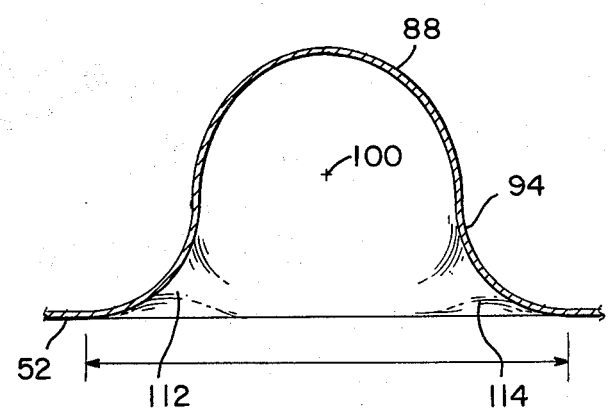
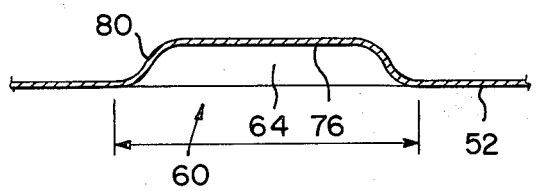
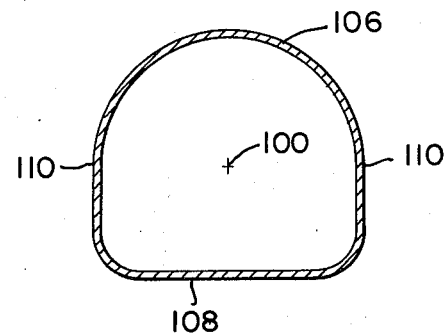
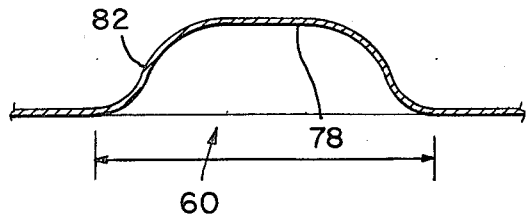
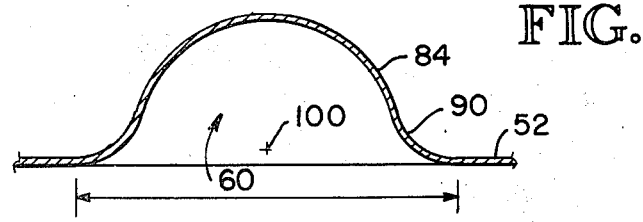

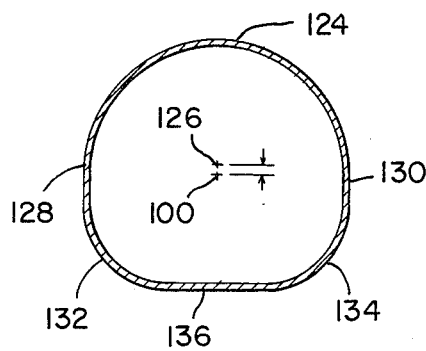
FIG. 12
FIG. 13
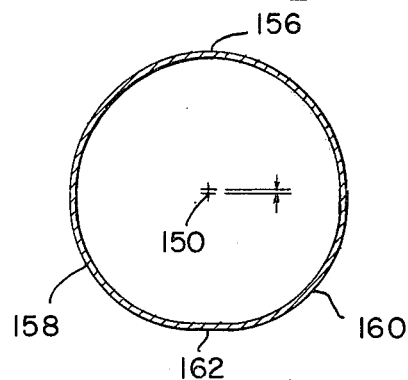
FIG. 14
FIG. 15
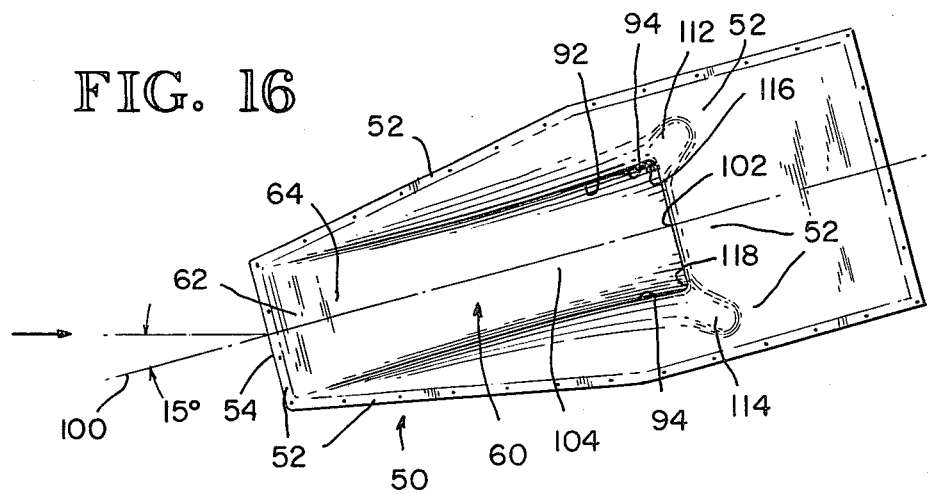
FIG. 16

HIGH PERFORMANCE SUBMERGED AIR INLET

The Government has rights in this invention pursuant to Contract No. F33615-77-C-0119 awarded by the U.S. Air Force.

BACKGROUND OF THE INVENTION

To enable a turbojet engine to operate efficiently, it is necessary that the air entering its compressor have substantially uniform velocity, pressure, and direction of flow around the entire circumference of the inlet. It is of special importance that all of the blades of the first stage of the compressor encounter air that is moving at nearly the same velocity. In normally adequate inlets, the desired uniform pressure, velocity, and flow direction have not been obtained across the inlet at times when the inlet directions were oblique to their longitudinal axes, that is, during subsonic flight at high angles of attack or in a yaw for example.

In some of the prior art intake ducts, there are wall portions that define opposite interior surfaces which extend parallel to the longitudinal axis of the aircraft. One of these surfaces becomes a lee surface and the other a weather surface when the aircraft moves obliquely to the longitudinal axis of the duct, and the airstream moving into the duct has to curve through an angle corresponding to the angle between the longitudinal axis of the aircraft and its direction of flight. The result is that there are differences in velocity and in pressure in the air at different points across the cross section of the curving stream flow.

Boundary layer air accumulates on the wall surface ahead of an inlet. Because of this accumulation of boundary layer air, the downstream air at a compressor inlet has one zone in which its velocity and stagnation pressure are substantially lower than the average velocity and pressure of the air moving to the compressor inlet. In another zone, circumferentially spaced from the first, the velocity and stagnation pressure of the air are higher than the average. The result is that the compressor blades, as they rotate, pass through the zones successively, alternately encountering air moving at high relative velocity and at low relative velocity. This circumferentially nonuniform distribution encourages the stalling of the blades and causes a cyclic pressure variation in the compressor, bringing about poor functioning and compacity of the engine and possible flameout.

In the prior art both parallel wall and diverging wall flush inlets have been studied. These inlets had right angle corners where the sides meet the skin of the aircraft and where they meet the ramp of the inlet. These sharp corners were used intentionally because they result in low energy boundary layer air being directed out of the inlet, it being important that a minimum amount of low energy air be allowed to enter the inlet. However, it was found that in these inlets problems were experienced when they were yawed with respect to the free stream direction. When yawed the inlets produced large amounts of nonuniform flow at the engine compressor face, resulting in poor engine performance.

In a low flying aircraft such as a cruise missile, which flies 200 feet off the ground, for example, there is an additional problem. That is, it is desired that the missile be not easily detected by radar and the typical protruding inlet presents the problem that it provides good radar return which is unsatisfactory in a cruise missile. The so-called flush or submerged inlet lowers radar return in that it has a low radar cross section.

SUMMARY OF THE INVENTION

The present invention is an improved generally parallel-walled, submerged inlet for an air breathing aircraft or missile, for example, that has excellent flow recovery and minimal distortion characteristics at angles of yaw up to 15°. It has a generally continuous smooth surface, a smooth cowl lip, slightly blunted but curved, and smooth contours in transverse directions and/or in cross sections. There is a smooth inwardly trailing entrance ramp developing into parallel sidewalls as the inlet deepens from an external plane. There are valleys formed laterally of the cowl lip, and leading portions of the valleys connecting the sidewalls with the lip are faired smoothly.

The aerodynamic contouring of the entrance ramp and sidewalls yields excellent performance under yawed flow conditions. The blending of the ramp fairing into the cowl lip aids in producing the performance under yawed flow.

Accordingly, it is an object of the invention to provide an improved submerged high performance inlet. Such an inlet is particularly desirable for an air breathing aircraft which flies at a relatively low level, for example, about an altitude of 200 feet, because a submerged inlet has a low radar cross section and therefore, lowers the radar return.

It is another object of the invention to provide an improved submerged inlet that has excellent total pressure recovery and low distortion characteristics at yaw angles up to 15° for a wide range of inlet mass flows. This is made possible by the smoothly contoured surfaces previously described, and which have been found to promote attached flow to the inlet surfaces with resulting low flow losses into and downstream of the inlet.

It is still another object of the invention to provide an inlet that at yaw angles up to 15° maintains a substantially uniform velocity and pressure distribution circumferentially on the inlet surfaces, and through the inlet and into an aircraft. It is the attached flow with attendant low flow losses that reduces the differences in velocity and in pressure in the flow at different points across the inlet cross sections. The attached flow maintains nearly uniform distribution of the airflow through the inlet so as to have quality engine function and the elimination of stall and flameout.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 4 is a cross-sectional view taken along the line 4—4 in FIG. 3;

FIG. 5 is a cross-sectional view taken along the line 5—5 in FIG. 3;

FIG. 6 is a cross-sectional view taken along the line 6—6 is FIG. 3;

FIG. 7 is a cross-sectional view taken along the lines 7—7 in FIG. 3;

FIG. 8 is a cross-sectional view taken along the line 8—8 in FIG. 3;

FIG. 9 is a cross-sectional view taken along the line 9—9 in FIG. 3;

FIG. 10 is a cross-sectional view taken along the line 10—10 in FIG. 3;

FIG. 11 is a cross-sectional view taken along the line 11—11 in FIG. 3 and perpendicular to the axis of the inlet;

FIG. 12 is a cross-sectional view taken along the line 12—12 in FIG. 3 and perpendicular to the axis of the inlet;

FIG. 13 is a cross-sectional view taken along the line 13—13 in FIG. 3, and perpendicular to the axis of the inlet;

FIG. 14 is a cross-sectional view taken along the line 14—14 in FIG. 3 at a curve in the inlet axis;

FIG. 15 is a cross-sectional view taken along the lines 15—15 in FIG. 3 at an inner end of the inlet;

FIG. 16 is a plan view of the inlet;

DESCRIPTION OF THE PRIOR ART

Figure 22:
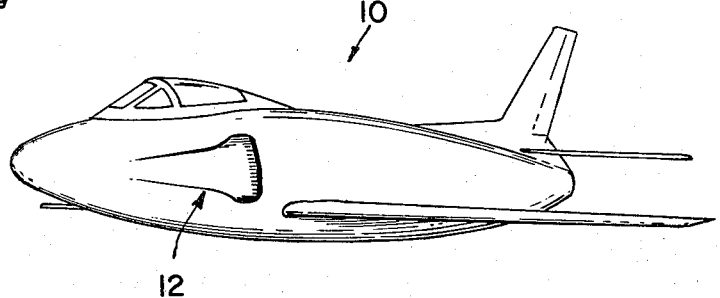
FIG. 22 is a prior art submerged inlet in the side of an aircraft.
Figure 23:
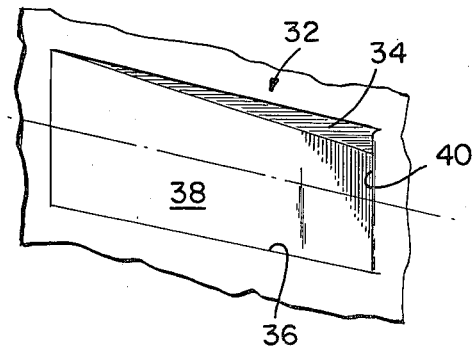
FIG. 23 is a perspective view of a prior art submerged air inlet having flat sides and sharp corners.
Figure 24:
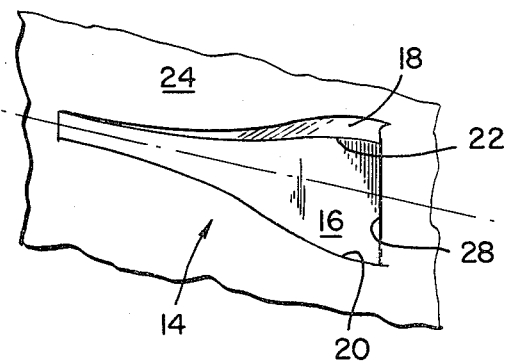
FIG. 24 is a perspective view of a prior art air inlet having a diverging sharp-cornered walls.
Figure 25:
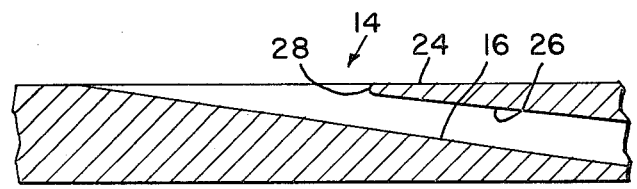
FIG. 25 is a side cross-sectional view of a prior art inlet similar to those in FIGS. 23 and 24.
Figure 26:
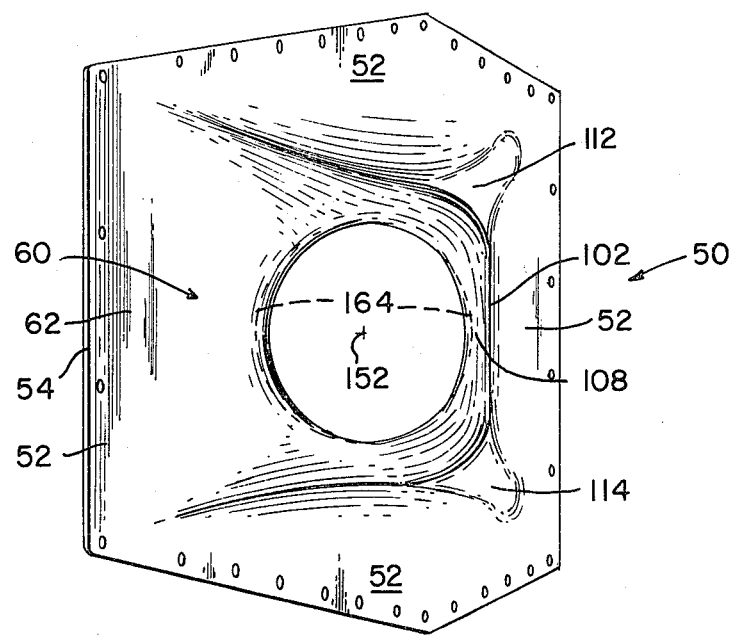
FIG. 26 is a perspective end view of the inlet according to the invention.

Referring again to the drawings, in FIGS. 22-25, examples of prior art flush aircraft air inlets are illustrated. The inlets shown are typical of those tested by the National Advisory Committee for Aeronautics. In FIG. 22 an aircraft 10 has a diverging flush inlet 12 for supplying air to an air breathing engine. The same type of inlet is on the other side of the airplane, not shown, for supplying an engine on that side. In FIG. 24 a flush air inlet 14, similar to the air inlet 12, is shown. The inlet 14 has a flat bottom 16, best seen in FIG. 25, and has diverging vertical sidewalls 18 and 20, extending vertically outwardly from the bottom 16. Between the walls 16 and 18 and 16 and 20, there are sharp corners 22 and there are also sharp corners where the walls 18 and 20 terminate on the surface 24 of the aircraft. An upper surface 26 is also flat and has a forward lip at 28.

Similarly in FIG. 23, there is an inlet 32 having generally parallel flat sidewalls 34 and 36 forming sharp corners with a bottom surface 38. The cross-sectional view in FIG. 25 also indicates the cross section of the inlet 32.

Versions of the inlets shown in FIGS. 22-25 have been used in aircraft and have had good performances at zero yaw angle. However, the recovery pressure decreased and distortion increased in the inlet flow when the inlets were yawed with respect to the free air stream. It has been found that this was caused by the sharp corners on the inlets which produced flow separation when the inlet was yawed. That is, the air stream detached the flow with resulting high flow losses into the inlet. Such high flow losses produced inadequate and varied air pressure into compressors, for example, to bring about poor functioning and poor capacity of the engine, and possible flameouts.

DESCRIPTION OF THE PREFERRED EMBODIMENTS

Figure 1:
FIG. 1 is an elevational view of an aircraft in which the invention is employed.
Figure 2:
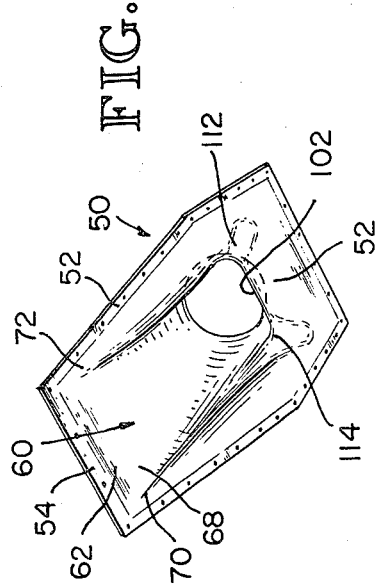
FIG. 2 is a perspective view of an inlet according to the invention.

The present invention, for use in air breathing aircraft, for example, is shown in FIGS. 1-21 and 26. In FIG. 1, a submerged inlet 50 is shown with its opening in the belly of a missile, forwardly of an air breathing engine, not shown. The outer configuration of the inlet 50 is best seen in FIGS. 2, 3, 16, and 26. The inlet has a peripheral plane surface 52, generally in the same plane as the immediately surrounding surface of the aircraft or missile. The plane surface 52 has a leading edge therein at 54, FIGS. 3 and 4, and from the leading edge a ramp surface 60 trails inwardly into the aircraft. The ramp extends inwardly from the edge 52 in a slight curve 62, relatively short in length, FIGS. 2, 3, 16 and 26.

Figure 3:
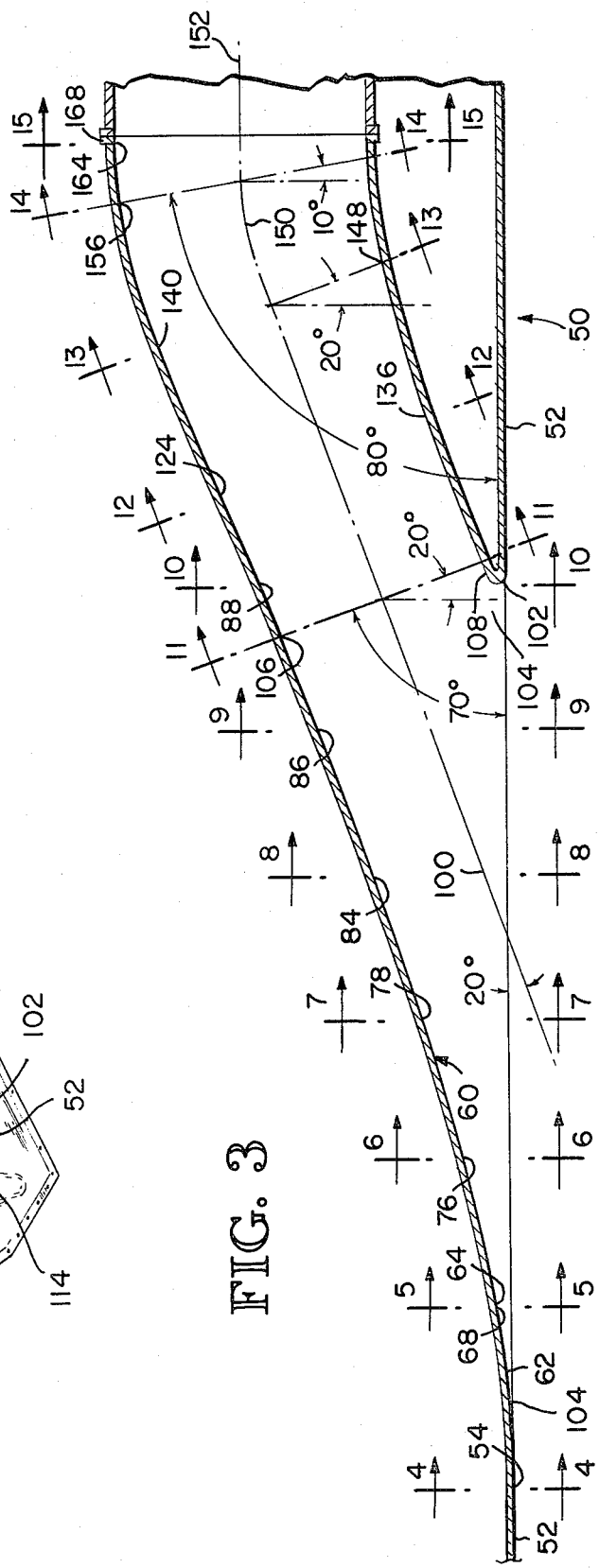
FIG. 3 is a side cross-sectional view of the inlet.
Figure 17:
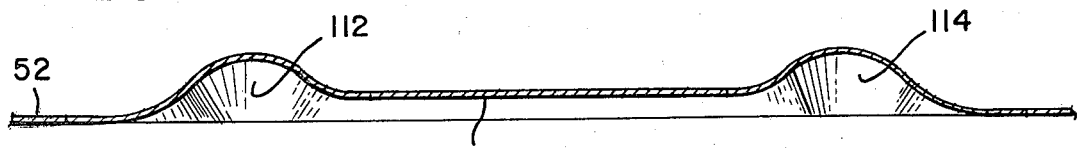
FIG. 17 is a cross-sectional view taken adjacent the intersection of a cowl lip and the sidewalls, illustrating the valleys formed transversely outwardly of the cowl.

Inwardly of the curved surface 62, a shallow channel is formed at 64, FIGS. 3, 5. A channel bottom 68 extends substantially across the ramp 60 and terminates in relatively short ogee curves 70 and 72, the outer portions of which extend into the plane 52.

As the ramp 60 trails and deepens inwardly, the channel 64 deepens and the flat bottom narrows as at 76 and 78, FIGS. 3, 6 and 7. At the same time the ogee curves 80 and 82 are lengthened.

In FIGS. 8, 9 and 10, the flat bottom of the ramp continues into a series of partial ellipses 84, 86 and 88, deepening toward a partial circular configuration. As the ellipses become deeper, the respective ogee curves, as 90, 92 and 94, cover a greater area of the inlet, and starting with FIG. 5, develop generally parallel sidewalls in the channel configurations and in the partial ellipses. It should be noted that in FIGS. 5-10 the starting points of the ogee curves on both sides of the inlet are at substantially the same distances from each other in each figure so that it is clear that sidewalls of the cross sections shown have substantially parallel walls. The ogee curves 90, 92 and 94 each successively terminate in the plane surface 52 at greater respective distances from the axis 100, FIGS. 3 and 8-10. This lengthening of the ogee curves provides for a smoother surfaced inlet trailing toward a cowl 102, FIGS. 2, 3, 16, 21 and 26. The cowl lip is smooth and slightly blunted at its leading curvature. The axis of the inlet is at 20° with the plane 52, FIG. 3, but could also be at 30° with the plane, for example. It is considered for reasons of convenience that the inlet opening 104, FIGS. 3 and 16, extends outwardly of the ramp 60 where it trails inwardly from the surface at 54 in the plane 52 to the area starting with the cowl from which, in a plan view as FIG. 16, the inlet is covered by an outer surface starting with 108, FIGS. 3, 11 and 26.

In FIGS. 2, 10, 16-19 and 26, grooved-shaped valleys or recesses 112 and 114 extend from a leading position with respect to the cowl 102 and extend laterally and trail with respect to the cowl so as to terminate into the plane 52. The valleys extend from leading faired positions 116 and 118 ahead of the cowl to form the intersections of the cowl lip and the sidewalls trailing from the sidewall portions 92 and 94, respectively. The valleys are at their nadirs just forwardly of the cowl at faired surfaces at 116 and 118, FIG. 16, from which they trail so as to merge into the plane 52. Valley recesses in cross sections at 108, FIGS. 3, 11, and 17, trail the line 10—10 in FIG. 3, and are inwardly of the cowl but not to the extent of the recesses at 116 and 118.

Figure 18:
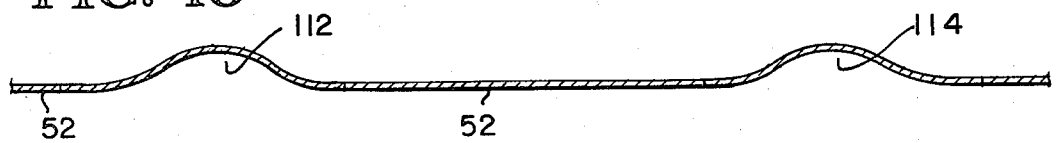
FIG. 18 is a view, similar to that in FIG. 17, taken downstream and outwardly of the cowl lip.
Figure 19:
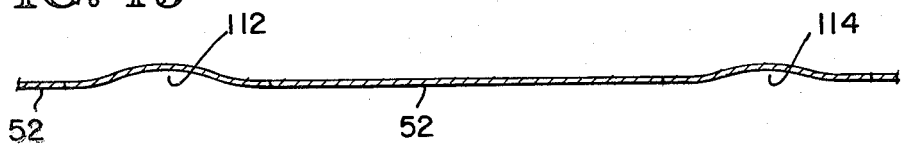
FIG. 19 is a cross-sectional view, similar to that in FIG. 18, taken downstream of the cross section in FIG. 18 and outwardly of the cowl lip.
Figure 20:
FIG. 20 is a cross-sectional view of an outer plane surface of the inlet structure downstream of the valleys.
Figure 21:
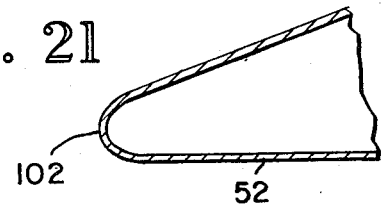
FIG. 21 is a side cross-sectional view of the cowl lip and inner and outer portions of the cowl surface downstream of the lip.

In FIGS. 18-20, as the recessed portions 112 and 114 trail from the cowl, they become more shallow until they merge into the plane 52, as indicated in FIGS. 16 and 20.

Inside of the inlet and the cowl, trailing the opening 104 and starting at cowl lip, and 108 for example, in FIGS. 11-13, the views are in cross sections perpendicular to the axis 100 and the lines 11—11, 12—12, and 13—13 in FIGS. 3 are at an angle of 70° with the plane 52. Because FIG. 10 is not a cross section at 90° to the axis 100, the curve 88 is elliptical; whereas the section in FIG. 11 is at 90° to the axis and the curved portion 106 is an approximate semicircle with straight parallel sidewalls 110. The sidewalls 110 and the outer wall 108 are joined by smooth curves.

In FIG. 12, the center of the opening is on the axis 100 and the ramp curve 124 is circular and has its center at 126. Extending from the less than semicircular curve 124 are parallel straight sidewalls 128 and 130 terminating outwardly in curves 132 and 134 and which join a shortened flat outer surface 136.

In FIG. 13, the inlet further approaches a true circle, having a semicircle 140 having its center on the axis 100. The parallel sidewalls merge into curved surfaces 142 and 144, centered at 146, and which are smooth continuances of the semicircle 140. At the outer end they smoothly extend into a further shortened flat surface 148.

Between FIGS. 13 and 14, and lines 13—13 and 14—14 in FIGS. 3, the axis 100 is curved at 150 and continues to curve in the cross section of FIG. 14. After FIG. 14, FIG. 3, the axis again straightens centrally as 152. The line 14—14 in FIG. 3 is at an angle of 80° with the plane 52, following the curve of the axis. In FIG. 14 the upper part of the outlet is a semicircle 156 having its center on the curved axis 150. A lower part of the section is formed by two parallel curves 158 and 160 which form a smooth connection with the semicircle 156 and with a still further shortened flat bottom portion 162.

The inlet terminates in a true circle 164 having its center on axis 152, the true circular cross section extending from the lines 15—15 in FIG. 3 to the flange 168 at the inlet end.

The shown development of the smooth contour surfaces, in contrast to the square corners in the prior art, are novel. Wind tunnel tests have shown that the present inlet has total pressure recovery and low distortion characteristics at yaw angles up to 15°, plan view FIG. 16, for a wide range and inlet mass flow. This is because the smoothly contoured surfaces promote attached flow of the inlet air to the inlet surfaces. That is, during normal operation and at yaw angles up to 15°, there is a very small loss of flow from the surfaces of the inlet. By having the inlet flow remain attached to the smooth surfaces, there is a minimum amount of low energy air that enters the inlet. This insures a constant high energy flow to a compressor, for example, so as to prevent stalling and flameout.

In addition the submerged inlet section in an aircraft has a much lower radar cross section than a conventional pitot inlet.

The blending of the parallel sidewalls into the fairing of the valleys outwardly of the cowl lip aids in accomplishing excellent performance during yawed flow conditions.

The invention and its attendant advantages will be understood from the foregoing description and it will be apparent that various changes may be made in the form construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. An inwardly extending, submerged, smooth surfaced air inlet, comprising:
   an inlet opening having wall surfaces adapted to be flush with or inwardly of a body surface;
   said wall surfaces having a leading and outer end in a plane, said wall surfaces extending inwardly and forming an uncovered shallow channel-shaped portion of the inlet;
   said channel portion deepening inwardly in the trailing direction continuing into an outwardly opening, partial ellipse portion;
   said partial ellipse portion deepening inwardly as it extends in a trailing direction and having substantially parallel wall surfaces extending outwardly of the ellipse portion in the direction toward the level of said plane;
   extensions of said substantially parallel wall surfaces diverging outwardly to said plane; and
   an inwardly trailing surface, spaced outwardly from said partial ellipse portion, being joined to said substantially parallel wall surfaces to form an outer cover for a trailing part of said inlet and of said partial ellipse portion;
   said inlet, including said cover, trailing inwardly, and being contoured radially as it trails to form a substantially circular wall surface at its inner end.

2. The invention according to claim 1 in which:
   said channel portion has a flat surface base, narrowing and trailing inwardly into said partial ellipse portion;
   the wall surfaces of said channel portion extending from said base in the form of ogee curves having outer diverging ends terminating in said plane.

3. The invention according to claim 2 in which:
   said partial ellipse portion, formed as a continuation of said channel portion, has ogee curves formed with said ellipse portion on each side thereof, said ogee curves trailing and continuing from those curves on said channel walls, said ogee curves formed with said partial ellipse portion terminating in said plane.

4. The invention according to claim 2 in which:
   said extensions of said substantially parallel wall surfaces form ogee curves with said partial ellipse portion and with said last wall surfaces on both sides of said ellipse portion.

5. The invention according to claim 1 in which:

said inwardly trailing surface has a leading, substantially straight edge across inlet opening;

said edge being substantially perpendicular to the direction of an axis of said partial ellipse portion;

said edge being the leading edge of a cowl, blunted to have a relatively sharp curve around said edge.

6. The invention according to claim 5 in which:

an outer trailing surface extending from said cowl generally in said plane.

7. The invention according to claim 6 in which:

said cowl is centrally positioned transversely across said inlet and is transversely inwardly spaced from said substantially parallel wall surfaces, recesses formed in the spaces adjacent the cowl and parallel wall surfaces, said recesses being faired and having a trailing curvature merging into said plane.

8. The invention according to claim 1 in which:

said trailing part of said inlet having said outer cover has smooth closed wall surfaces;

a leading portion of said outer cover having a flat surface, narrowing and becoming generally circular as it trails inwardly.

9. The invention according to claim 1 in which:

all surfaces of said inlet are smooth and all joining surfaces are curved.

10. The invention according to claim 7 in which:

said recesses are groove-shaped in cross sections generally perpendicular to said plane;

said grooves trailing laterally on both sides of said cowl;

said cowl leading edge being transversely inwardly of said grooves.

11. The invention according to claim 10 in which:

said grooves being formed so as to have portions thereof leading with respect to said cowl edge;

said leading portions being in said opening and being outward extensions of said wall surfaces in the direction toward said plane.

12. The invention according to claim 11 in which:

said leading portions of said grooves have their nadirs inwardly of said cowl edge in the direction away from said plane.

13. The invention according to claim 12 in which:

said leading portions have leading edges transversely outwardly of said cowl edge;

said leading edges of said leading portions having trailing surfaces forming curves which join said wall surfaces with said inwardly trailing surface and said cowl.

14. The invention according to claim 1 in which:

said inwardly trailing surface has a leading, substantially straight edge across said inlet opening;

said edge being substantially perpendicular to the direction of an axis of said partial ellipse portion;

said edge being the leading edge of a cowl, blunted to have a relatively sharp curve around said edge;

an outer trailing surface extending from said cowl generally in said plane;

said cowl is centrally positioned transversely across said inlet and is transversely inwardly spaced from said substantially parallel wall surfaces; and grooved-shaped recesses formed in the spaces adjacent the cowl and parallel wall surfaces;

said recesses being faired and having a trailing curvature merging into said plane, and extending laterally on both sides of said cowl.

15. An inwardly extending submerged air inlet for use forwardly of an engine in an aircraft, comprising:

an inlet opening having smooth surfaces, all of said surfaces extending along or inwardly of a plane adapted to be approximately flush with surrounding surfaces of an aircraft;

said inlet trailing inwardly of said opening and having smooth contours in a transverse direction;

a smooth ramp surface forming an inner surface of said inlet opening and trailing inwardly of said opening;

inwardly trailing, substantially parallel smooth side wall surfaces having transverse curves joining said ramp surface, said side wall surfaces extending outwardly in the direction toward said plane;

a smooth cowl lip extending transversely adjacent the trailing end of said opening;

an inwardly trailing smooth surface extending from said lip, and forming an outer surface of said inlet and joining said side wall surfaces with curves to transversely peripherally close said inlet; and smoothly curved grooved-shaped recesses formed adjacent intersections of said cowl lip and said side wall surfaces, said recesses trailing into the level of said plane.

16. The invention according to claim 15 in which:

said smooth surfaces are means to provide attached air inlet flow on said inlet surfaces so as to have low flow losses.

17. The invention according to claim 15 in which:

said smooth surfaces are means to provide total air inlet pressure recovery and lower distortion characteristics at yaw angles up to 15° for a wide range of inlet mass flows.

18. The invention according to claim 15 in which:

said inlet has a central trailing, inwardly extending axis;

said axis and inlet being at an acute angle with said plane, the axis and inlet being at the same angle inwardly beyond cowl;

said axis and inlet curving beyond said cowl to be substantially parallel to said plane.

19. The invention according to claim 15 in which:

said recesses are valleys in cross sections generally perpendicular to said plane;

said valleys trailing beyond said intersections and said cowl lip laterally on both sides of said lip;

said lip being centrally transversely inwardly of said intersections and said valleys.

20. The invention according to claim 19 in which:

said valleys being formed so as to have portions thereof leading with respect to said lip;

said leading portions being in said opening and being outward extensions of said side wall surfaces in the direction toward said plane.

21. The invention according to claim 20 in which:

said leading portions of said valleys have their nadirs inwardly of said lip in the direction away from said plane.

22. The invention according to claim 21 in which:

said leading portions have leading edges transversely outwardly of said lip;

said leading edges of said leading portions having trailing surfaces forming said curves which join said side wall surfaces with said inwardly trailing smooth surface extending from said lip.

23. An inwardly extending, submerged, smooth surfaced air inlet, comprising:
an inlet opening having wall surfaces adapted to be flush with or inwardly of a body surface;
said wall surfaces having a leading and outer end in a plane, said wall surfaces extending inwardly and forming an uncovered shallow channel-shaped portion of the inlet;
said channel portion deepening inwardly in the trailing direction continuing into an outwardly opening, partial ellipse portion;
said partial ellipse portion deepening inwardly as it extends in a trailing direction and having substantially parallel wall surfaces extending outwardly of the ellipse portion in the direction toward the level of said plane;
extensions of said substantially parallel wall surfaces diverging outwardly to said plane;
an inwardly trailing surface, spaced outwardly from said partial ellipse portion, being joined to said substantially parallel wall surfaces to form an outer cover for a trailing part of said inlet and of said partial ellipse portion;
said inlet, including said cover, trailing inwardly, and being contoured radially as it trails to form a substantially circular wall surface at its inner end;
said inwardly trailing surface having a leading, substantially straight edge across said inlet opening;
said edge being substantially perpendicular to the direction of an axis of said partial ellipse portion;
said edge being the leading edge of a cowl, blunted to have a relatively sharp curve around said edge;
an outer trailing surface extending from said cowl generally in said plane;
said cowl being centrally positioned transversely across said inlet and transversely inwardly spaced from said substantially parallel wall surfaces; and
recesses formed in the spaces adjacent the cowl and parallel wall surfaces;
said recesses being faired and having a trailing curvature merging into said plane;
said recesses being groove-shaped in cross sections generally perpendicular to said plane;
said grooves trailing laterally on both sides of said cowl;
said cowl leading edge being transversely inwardly of said grooves.

24. The invention according to claim 23 in which:
said grooves being formed so as to have portions thereof leading with respect to said cowl edge;
said leading portions being in said opening and being outward extensions of said wall surfaces in the direction toward said plane.

25. The invention according to claim 24 in which:
said leading portions of said grooves have their nadirs inwardly of said cowl edge in the direction away from said plane.

26. The invention according to claim 25 in which:
said leading portions have leading edges transversely outwardly of said cowl edge;
said leading edges of said leading portions having trailing surfaces forming curves which join said wall surfaces with said inwardly trailing surface and said cowl.

27. An inwardly extending submerged air inlet for use forwardly of an engine in an aircraft, comprising:
an inlet opening having smooth surfaces, all of said surfaces extending along or inwardly of a plane adapted to be approximately flush with surrounding surfaces of an aircraft;
said inlet trailing inwardly of said opening and having smooth contours in a transverse direction;
a smooth ramp surface forming an inner surface of said inlet opening and trailing inwardly of said opening;
inwardly trailing, substantially parallel smooth side wall surfaces having transverse curves joining said ramp surface, said side wall surfaces extending outwardly in the direction toward said plane;
a smooth cowl lip extending transversely adjacent the trailing end of said opening;
an inwardly trailing smooth surface extending from said lip, and forming an outer surface of said inlet and joining said side wall surfaces with curves to transversely peripherally close said inlet; and
smoothly curved recesses formed adjacent intersections of said cowl lip and said side wall surfaces, said recesses trailing into the level of said plane;
said recesses being valleys in cross sections generally perpendicular to said plane;
said valleys trailing beyond said intersections and said cowl lip laterally on both sides of said lip;
said lip being centrally transversely inwardly of said intersections and said valleys.

28. The invention according to claim 27 in which:
said valleys are formed so as to have portions thereof leading with respect to said lip;
said leading portions being in said opening and being outward extensions of said side wall surfaces in the direction toward said plane.

29. The invention according to claim 28 in which:
said leading portions of said valleys have their nadirs inwardly of said lip in the direction away from said plane.

30. The invention according to claim 29 in which:
said leading portions have leading edges transversely outwardly of said lip;
said leading edges of said leading portions having trailing surfaces forming said curves which join said side wall surfaces with said inwardly trailing smooth surface extending from said lip.

* * * * *

UNITED STATES PATENT AND TRADEMARK OFFICE
CERTIFICATE OF CORRECTION

PATENT NO. : 4,378,097
DATED : March 29, 1983
INVENTOR(S) : Stanley D. Ferguson and Donald W. Eastman It is certified that error appears in the above-identified patent and that said Letters Patent are hereby corrected as shown below:

In claim 5, column 7, line 5, "inlet opening" should be --said inlet opening--.

Signed and Sealed this

Sixth Day of December 1983

[SEAL]

Attest:

GERALD J. MOSSINGHOFF

*Attesting Officer*     *Commissioner of Patents and Trademarks*